DICKIE & JOHNSTON.
Plow.
No. 106,559. Patented Aug. 23, 1870.
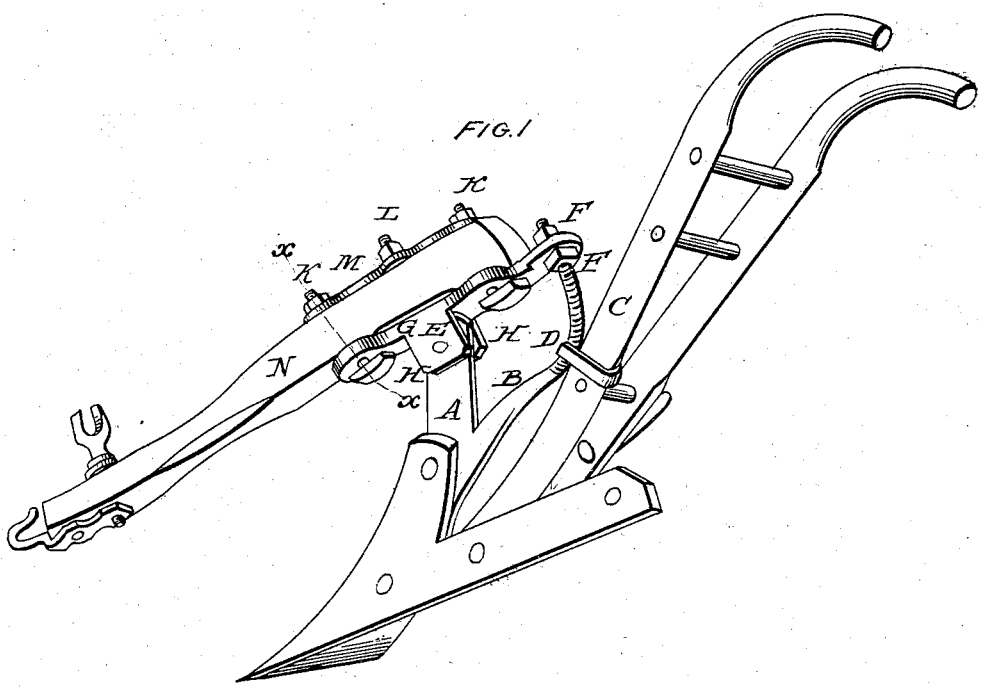
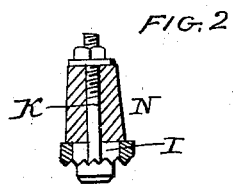
WITNESSES
INVENTOR

UNITED STATES PATENT OFFICE.

ROBERT DICKIE AND HUGH KIRKWOOD JOHNSTON, OF BUNKER HILL, ILL.

IMPROVEMENT IN PLOWS.

Specification forming part of Letters Patent No. 106,559, dated August 23, 1870.

*To all whom it may concern:*

Be it known that we, ROBERT DICKIE and HUGH KIRKWOOD JOHNSTON, of Bunker Hill, in the county of Macoupin and State of Illinois, have invented a new and useful Improvement in Plows; and we do hereby declare that the following is a full, clear, and exact description thereof, which will enable others skilled in the art to make and use the same, reference being had to the accompanying drawing, forming part of this specification.

This invention relates to improvements in plows; and consists in attaching the beam to the plow in a novel manner for adjusting it horizontally for varying the breadth of the furrow, and vertically for varying the depth.

Figure 1 is a perspective view of our improved plow, and Fig. 2 is a section on the line $x$ $x$ of Fig. 1.

Similar letters of reference indicate corresponding parts.

We extend the vertical bar A higher than as in the plows as commonly constructed, and provide the brace B in connection with it, which is extended rearward to the handle C, and coupled therewith by the band D, or in any other suitable way. Above this band the brace is curved on a radius extending to the pivot-bolt E. It is also screw-threaded above the said band and provided with the nuts F.

G is a strong metal plate, having two ears projecting from the lower side for pivoting it to the top of bar A by the bolt E. At the rear end it has a hole for the curved brace B. It also has elongated holes I near each end for the clamping-bolts K, and a central hole for the pivot-bolt L. The under surface is serrated around the holes I, and the sides of the bolt-heads fitting against the said parts are also serrated.

A plate, M, is fitted upon the top of the beam N, for the nuts of the several plates to screw down upon in clamping the beam to the strong plate G, the beam being fitted upon it and the bolts K and L passing through it.

It will be seen that by this arrangement the beam may be readily adjusted, relatively to the plow, either horizontally or vertically, to any required extent for varying the breadth or depth of the furrows within a very wide range.

The vertical adjustment is effected by shifting the nuts F on the brace B, and the horizontal adjustment by loosening the bolts K and swinging the beam on the pivot-bolt L. Then the said bolts are screwed up again to secure the beam. The serrated surfaces of the plate and bolt-heads prevent any slipping.

Having thus described our invention, we claim as new and desire to secure by Letters Patent—

The standard A, screw-threaded brace-rod B, screw-nuts F F, plate G, and clamp-bolts K, passing through elongated perforations I of said plate, all constructed and arranged, with reference to the plow and beam, as shown and described, whereby the latter may be adjusted both horizontally and vertically, as and for the purpose specified.

ROBERT DICKIE.
HUGH KIRKWOOD JOHNSTON.

Witnesses:
JAS. F. CUMMINGS,
S. NOBLE SANFORD.